United States Patent [19]

Hotchkiss

[11] Patent Number: 4,973,503
[45] Date of Patent: Nov. 27, 1990

[54] MIXED FIBER TOW OR TUBE AND METHOD OF MAKING

[75] Inventor: Harry W. Hotchkiss, Marietta, Ga.

[73] Assignee: Kimberly-Clark Corporation, Neenah, Wis.

[21] Appl. No.: 748,888

[22] Filed: Jun. 26, 1985

[51] Int. Cl.$^5$ .................. B29D 22/00; D02G 3/00
[52] U.S. Cl. ........................... 428/36.4; 428/36.9; 428/198; 428/288; 428/294; 428/296; 428/357; 428/359; 428/364; 428/401
[58] Field of Search ............... 428/357, 359, 364, 373, 428/374, 376, 398, 296, 294, 198, 36, 288, 36.4, 36.9; 156/62.4, 167, 180

[56] References Cited

U.S. PATENT DOCUMENTS

| 3,357,807 | 12/1967 | Stalego | 156/62.4 X |
| 3,413,182 | 11/1968 | Simons | 156/62.4 X |
| 3,615,998 | 10/1971 | Kolb et al. | 156/167 |
| 3,758,373 | 9/1973 | Rich | 428/376 |
| 4,131,704 | 12/1978 | Erickson et al. | 428/296 X |

Primary Examiner—Lorraine T. Kendell
Attorney, Agent, or Firm—William D. Herrick

[57] ABSTRACT

An improved tow and method of making comprising a mixture of thermoplastic microfibers having an average diameter in the range of up to about 10 microns and being discontinuous but with a very high length to diameter ratio. The mixture is formed by physically entangling microfibers containing 10% to 90% of shorter fibers with the microfibers being predominantly aligned parallel to the axis of the tow and the mixture being bonded at contact points between microfibers and the shorter fibers. The method includes the steps of forming a melt with thermoplastic material and extruding it through one or more series of orifices arranged in a rounded configuration. The extruded melt is contacted with a first gas stream whereby a network of physically entangled microfibers is formed. A second gas stream is formed and the shorter fibers entrained therein are merged to form a mixture with the microfibers. The mixture is collected as a tow or tube of rounded cross section with the microfibers being predominantly aligned parallel to the axis of the tow. Variations include the use of different and combinations of short fibers and microfibers as well as varying the concentration of such fibers throughout the cross section of the tow or tube. Uses for such tows or tubes include beauty coils, tampons, cigarette filters, bottle stuffers, and, with additives, other products such as insulating caulking and the like.

10 Claims, 6 Drawing Sheets

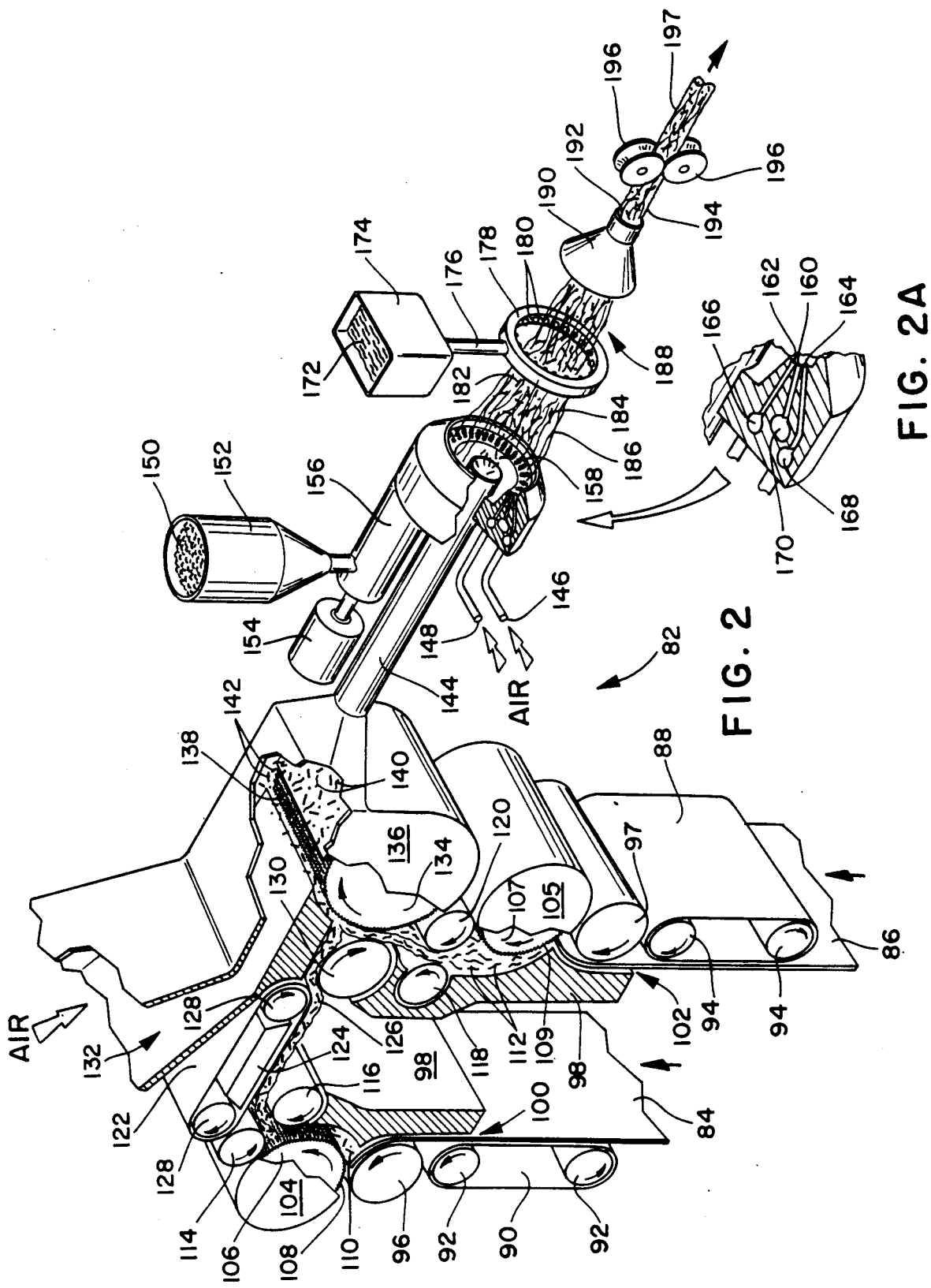

MIXED FIBER TOW OR TUBE AND METHOD OF MAKING

BACKGROUND OF THE INVENTION

1. Field of the Invention

This invention pertains to microfiber products and methods of making them. More specifically it relates to such products in tow or tube form containing a mixture of microfibers and larger diameter, short fibers and useful, for example, as tube or plug filters, beauty coils, tampons and for many other applications. Such structures will have a generally rounded cross section although it may not be perfectly circular. The entanglement of the microfibers provides an integrated network while the selection of the larger diameter, short fibers is made to impart desired porosity, loft, absorbency, strength or other properties as well as for increased economy. Methods for forming microfibers by meltblowing are preferred as is the use of a separate airstream to mix the larger diameter, short fibers with the microfibers. Such structures will find broad utility wherever a rope, tow, or tube of soft, porous absorbent fibers is desired.

2. Description of the Prior Art

Formation of microfibers by meltblowing is well-known and described, for example, in U.S. Pat. No. 3,595,245 to Buntin, Harding, Keller and Murdock dated 27 July 1971. That patent describes meltblowing of a tow using a cylindrical meltblowing die to form essentially continuous fibers that are looped back and forth on a forming rod and built up to the desired roving diameter. It is also suggested in the patent that other ingredients may be incorporated into the roving by injection into one or more of the airstreams although no specific details of such a process or product are described. It is further known as described in U.S. Pat. No. 4,100,324 to Anderson, Sokolowski and Ostermeier dated 11 July 1978 and U.S. Pat. No. 4,118,531 to Hauser dated 03 Oct. 1978 to form webs including microfibers having mixed therein through a separate airstream staple or other fibers. There is, though, no suggestion in these patents that a circular roving may be formed of such mixtures nor of a method for forming such a roving. U.S. Pat. No. 4,357,379 to Sloan, Wright, and Morie dated 02 Nov. 1982 describes a modification of the meltblowing process to form a rod by a stuffing technique including meltblowing into a horn and withdrawing the fibers in a manner such that they are oriented generally in a radial direction of the formed rod. Examples of uses for rovings or tows of meltblown microfibers are disclosed in the identified patents, and, in addition, U.S. Pat. No. 3,219,043 to Ehrlich and Teague dated 23 Nov. 1965 and U.S. Pat. No. 4,390,031 to Berger dated 28 June 1983 disclose filter applications for thermoplastic fiber cylindrical tows.

In spite of these teachings, it remains desired to form tows or tubes of microfibers with improved properties for tube or plug filters, e.g. cigarette filters, beauty coils, tampons and other applications. In particular, such microfiber tows having improved porosity, increased strength, absorbency, and other characteristics as well as potentially reduced costs are considered desirable. It is, moreover, desired to have improved methods for forming such tow or tube materials.

SUMMARY OF THE INVENTION

The present invention is directed to improved microfiber tow or tube products wherein larger diameter, short fibers are mixed with the microfibers. More specifically, the present invention is directed to such products of various configurations useful for tube or plug filters, beauty coils, and other applications wherein a porous, absorbent, rope-like tow, sliver, tube, sleeve or roving material of designed softness or rigidity is desired. The invention is further directed to methods for forming such tows or tubes of microfibers in admixture with other fibers.

In particular, the tube or tow of the present invention comprises a mixture of thermoplastic microfibers which are defined as having an average diameter in the range of up to about 10 microns. While such microfibers are discontinuous, when formed by meltblowing processes, they generally have a length to diameter ratio that approaches infinity. Bonding of microfiber webs occurs, in part, by entanglement and is enhanced by fusion bonding to the extent desired. Mixed with this network of physically entangled and fused microfibers in accordance with the invention are up to about 90 percent of larger diameter fibers of staple length or shorter. The microfibers are predominantly aligned in the mixture parallel to the axis of the roving, and the mixture is fuse bonded at contact points between microfibers and by entanglement with the short fibers. Alternatively, adhesive bonding may be employed. The method of the invention in its preferred embodiment comprises the steps of forming a melt of thermoplastic material, extruding the melt through one or more series of orifices arranged in a rounded configuration. The extruded melt is contacted with a first stream of gas whereby it is formed into a network of physically entangled microfibers that are attenuated to microfiber size. A second gas stream is used having entrained larger diameter, short fibers, and the gas streams are merged to produce a mixture of fibers which mixture is collected as a tow or tube having the desired fiber orientation. Embodiments include mixing two or more types of shorter fibers and varying the concentration of microfibers and/or shorter fibers so that the outer circumference contains a higher proportion of either when compared to the central portion of the tow or tube. Further embodiments include application of one or more treating agents to achieve desired properties. Such agents may include wetting agents, adhesives, strengthening agents, dyes, or other desired agents.

BRIEF DESCRIPTION OF THE DRAWINGS

FIG. 2 similarly illustrates an alternative arrangement with FIG. 2A as an enlargement of a portion of FIG. 2.

DESCRIPTION OF THE PREFERRED EMBODIMENTS

Figure 1:
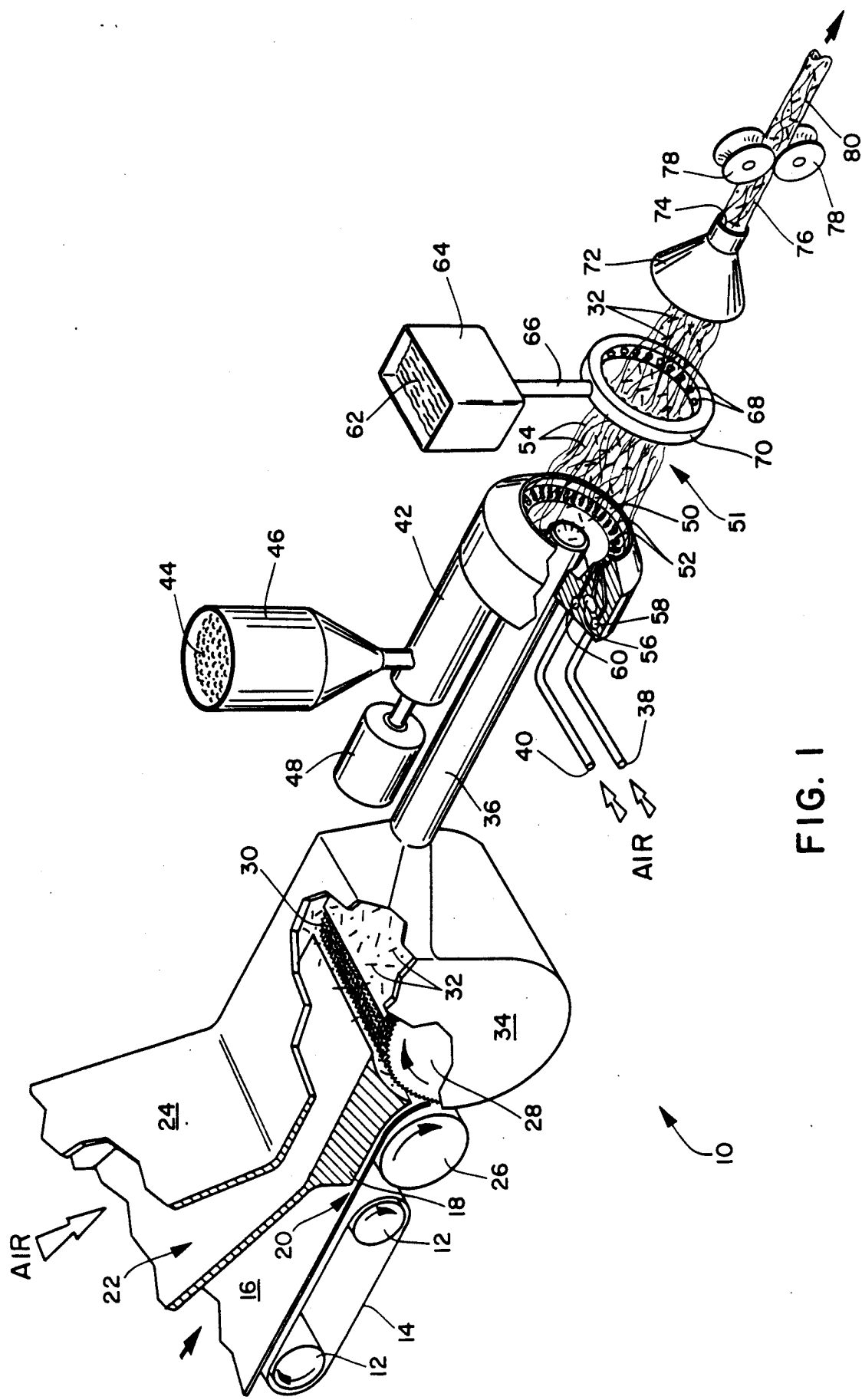
FIG. 1 illustrates, in schematic form and partially broken away, one form of apparatus useful for the method and forming the tow of the present invention.

As used herein the terms "tow", "roving" or "sliver" are used interchangeably to refer to an elongated column of entangled microfibers having a generally rounded cross section. Tubes refer to such columns having an open core which may constitute up to 99% preferably 40 to 90% of its cross-sectional area. The cross section need not be circular and, for some applications, it may be advantageous that it be elliptical, ovoid, or of some other irregular round configuration. However, in general, the cross-section will be round as contrasted with sheets, ribbons or the like. The diameter of the tow or tube will depend on the forming conditions and desired applications. For example, for use as a beauty coil, the diameter is preferably in the range from about 15 to 20 mm while application as a cigarette filter will usually require that the tow diameter be in the range of from about 6 to 8 mm.

The tow or tube in accordance with the invention is comprised of a mixture of microfibers and larger diameter, short fibers of another type which are selected to impart desired properties. The microfibers while discontinuous, generally have a very large length to diameter ratio usually exceeding at least about 30,000 on the average to form a physically entangled network with most fibers extending in a direction predominantly parallel to the axis of the tow or tube. The mixture may contain 10 to 90 percent, preferably 40% to 80% of the shorter fibers, and the mixture is bonded at contact points between the microfibers and by entanglement with the short fibers so that the tow or tube combination is integrated and the short fibers are prevented from separating from the network. The physical properties of the tow or tube will depend upon the desired end use and may vary over a wide range. For example, a beauty coil may have a density of about 0.025 g/cc, a cigarette filter about 0.174 g/cc, and a tampon about 0.655 g/cc. As will be apparent to those skilled in this art, the tube or tow will have a tensile strength sufficient to withstand the intended use, again, generally in the range of from about 300 g. to 10,000 g. for those uses described above. The short fibers may be selected from a wide variety of materials, again depending on the desired end use. For example, for use as a beauty coil, the short fibers may have a length, generally, in the range of from about 3 millimeters to 50 millimeters preferably about 20 millimeters to 40 millimeters and can be selected from those such as rayon, wood pulp, cotton, polyester staple, or the like. For other applications such as cigarette filters the short fibers may be cellulose acetate, for example. The tow or tube may also be made utilizing multiple types of shorter fibers selected from these groups and other such fibers to achieve cost or other product advantages. Also, the roving may be constructed so that the concentration of shorter fibers varies through the tow cross section, for example, with a higher concentration at the center or at the outer periphery of the tow. Such may be a particular advantage where it is desired to achieve controlled absorbency for liquids in beauty coil and other applications. For certain uses it may be desirable to treat the formed tow with air or other fluids such as water to achieve rapid quenching. Other desired properties may be attained by addition of treating agents to the treating water. For example, dyes may be used to color the tow or strength enhancing additives may be applied.

Figure 1A:
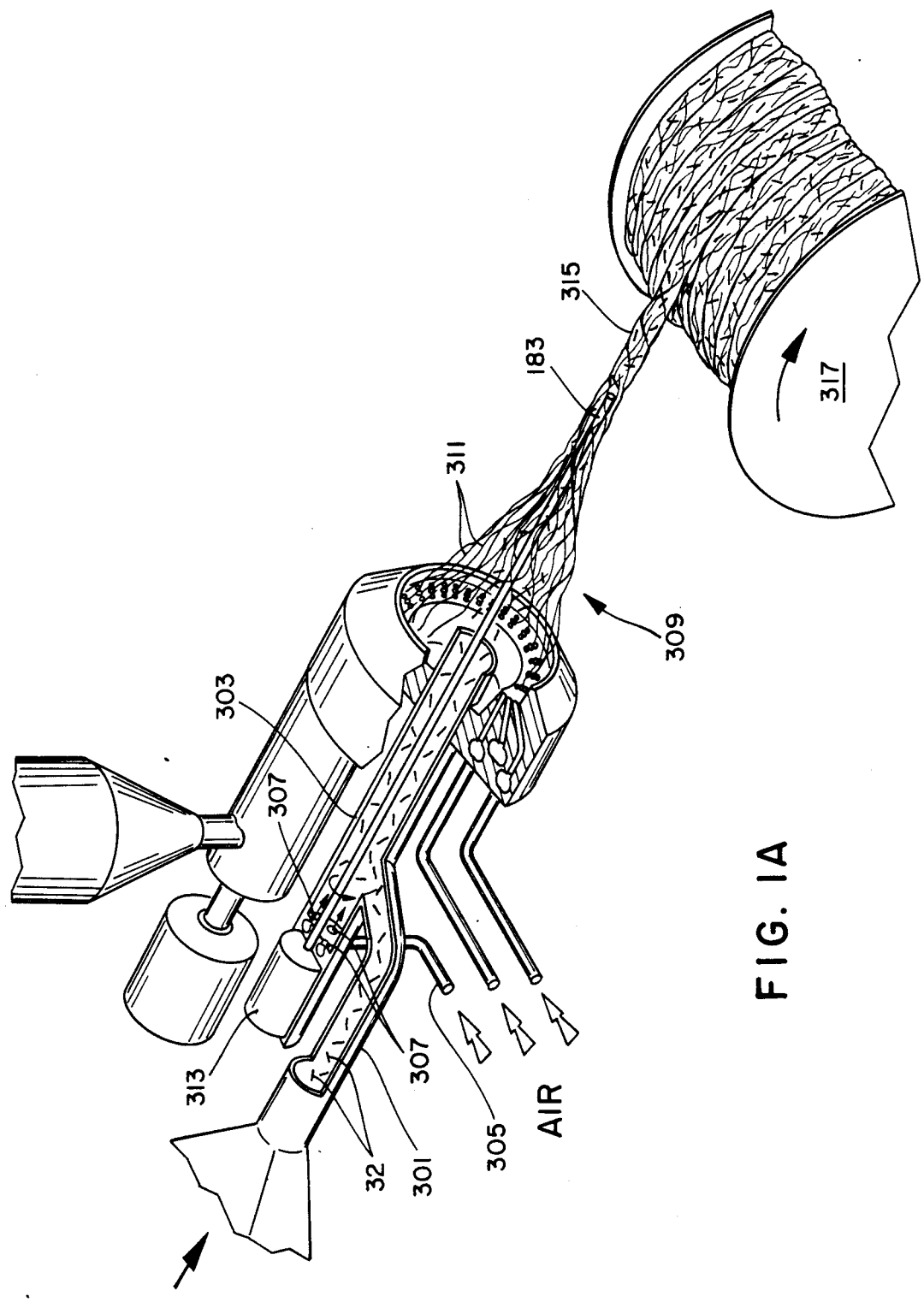
FIG. 1A illustrates a modified collection device for forming a tube.

Turning to FIG. 1, one method in accordance with the invention will be described for forming the tow of the invention. As illustrated, the forming system broadly indicated at 10 includes a web 16 formed of the shorter fibers which web is carried by conveyor 14 which forms an endless loop about support rolls 12, either or both of which may be driven. Web 16 is directed to nip 20 over support roll 26 to picker roll 28 having picker teeth 30 and housing 34 where the web is separated into fibers 32. Air in chute 22 also formed by support surface 18 and housing 24 carries the fibers 32 from the picker roll teeth 30 to conduit 36. Polymer 44 is supplied from storage 46 to extruder 42 driven by motor 48. Air or other gaseous stream such as steam is supplied through pipes 38 and 40 to die channels 60 and 58 and impinges on polymer 44 as the polymer emerges from die channel 56 through holes 52 in spinnerette die tip 50. This attenuates the polymer into filaments 54 in forming zone 51 which filaments are intermixed with the shorter fibers 32 to form an integrated mixture. If desired, the mixture of fibers may be quenched or otherwise treated by liquid 62 in storage container 64 directed by conduit 66 to spray nozzle 70 and through spray holes 68. The thus treated tow is then directed through horn 72 shaping the tow 76 at 74 which is pulled and further shaped by pull rolls 78 as formed tow 80 which is directed for storage or further processing. Either or both pull rolls 78 may be formed so as to shape the sliver 80 into a desired configuration and either or both of pull rolls 78 may be driven. The resulting tow is illustrated schematically in cross section in FIG. 5 which shows tow 80 comprised of microfibers 54 and shorter fibers 32 and having a generally circular cross section. FIG. 1A illustrates an alternative embodiment where the mixture is collected on stationary mandrel 181 and withdrawn as tube 315. In this case, short fibers 32 are blown in through conduit 301 and deposited within central conduit 303 which surrounds rod 183. Air from pipe 305 exits openings 307 and carries fibers 32 to mixing zone where they are combined with meltblown fibers 311 as in FIG. 1. Rod 183 may be stationary or may be rotated by motor 313 if it is desired to twist the resulting tube 315. The tube 315 may be directed for further processing or may be wound on core 317 for storage.

Turning to FIG. 2, an alternative arrangement will be described in which provisions are made for adding two different types and/or sizes of short fibers to the mixture with the microfibers. As will be appreciated by those skilled in this art, the arrangement of FIG. 1 may be used to incorporate mixtures of many different types of short fibers in the web 16. However the arrangement of FIG. 2 offers a wider opportunity for variations since two different webs of short fibers which may necessitate different separating conditions can be accommodated. In FIG. 2, short fiber web 84 is directed by conveyor belt 90 which forms an endless loop about support rolls 92, either or both of which may be driven, into nip 100 formed by support surface 98 and roll 96. The web 84 is separated by picker roll 106, having teeth 108 and enclosed in the housing 104, into individual fibers 110 which are carried by support rolls 114 and 116 to conveyor belt 122 which forms an endless loop about support rolls 128, either or both of which may be driven. Vacuum is applied at vacuum box 124 to maintain the fibers in position to be directed as batt 126 to support roll 130 which forms a combining zone with combining picker 134 having teeth 138 and contained within housing 136. A second web of short fibers 86 is carried in similar fashion by means of conveyor 88 over support roll 94 and onto engagement with support roll 97 and support 102 to picker roll 107 having teeth 109 in housing 105 forming fibers 112. These fibers 112 are directed between carrying rolls 118 and 120 into the combining nip with combining picker 134 and mixed in housing 136 to form a mixture of fibers 140 and 142. This mixture is directed using air through conduit 132 into conduit 144 and combined with meltblown microfibers 186 in the same manner as described with respect to FIG. 1. Thus, polymer 150 from supply 152 is directed to extruder 156 driven by motor 154. Air or other gaseous stream such as steam through pipes 148 and 146 is directed against the polymer as it exits die tip 158. This is illustrated in greater detail in FIG. 2A showing air channels 166 and 168 having nozzle openings 162 and 164 which contact the polymer as it exits from channel 170 through nozzle 160. After exiting die tip 158, the microfibers are combined with the shorter fibers 184 and 182 and may be treated with quench liquid 172 from storage 174 through conduit 176 to spray nozzle 178 having holes 180. The treated tow at 188 is directed into forming horn 190 forming tow 194 at exit 192 which is then directed to shaping and forming rolls 196, either or both of which may be driven to shape into final tow form 197 which is directed to storage or further processing.

Figure 3:
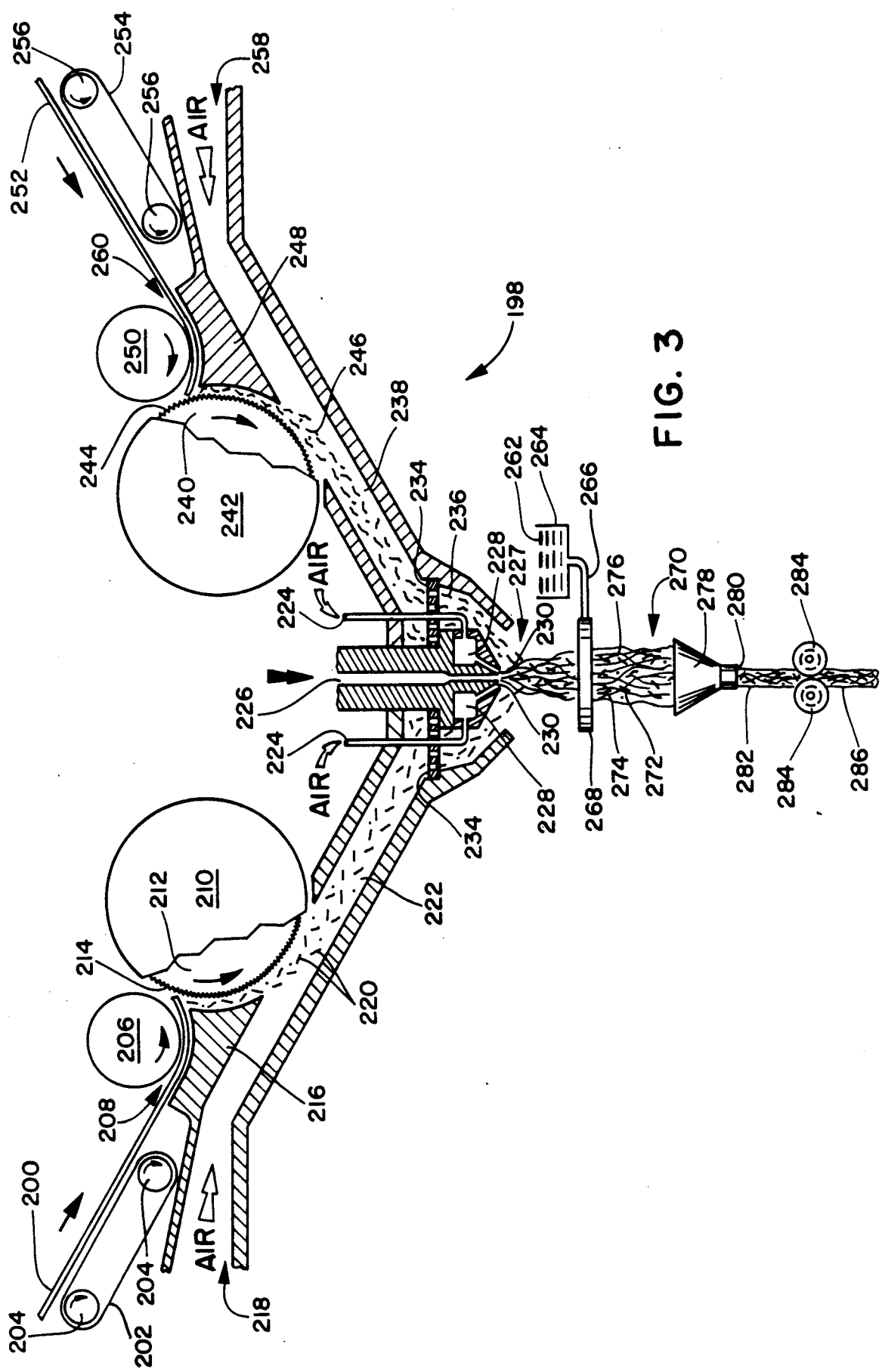
FIG. 3 illustrates yet another embodiment useful for incorporating multiple types of fibers into the tow.

Turning to FIG. 3, yet another embodiment will be described wherein different types of short fibers may be separately applied to the microfibers forming a tow having areas of higher concentration of each type of fiber. As shown, in this forming arrangement 198 web 200 of one type of short fiber is directed over conveyor belt 202 which forms an endless loop about support rolls 204, either or both of which may be driven. Web 200 is directed to nip 208 formed by support roll 206 and support 216 and then into contact with picker roll 212 in housing 210 and having teeth 214. Picker 212 separates the web 200 into individual fibers 220 which are carried by the air stream entering conduit 222 by means of 218. On the opposing side, a similar arrangement provides for separation of web 252 of another or the same short fibers 236 supported by conveyor 254 which forms an endless loop about support rolls 256, either or both of which may be driven. Web 252 is directed into nip 260 between support roll 250 and support 248 to picker roll 240 in housing 242 and containing teeth 244. It is broken into fibers 246 which are carried by the air or other gaseous stream such as steam entering at 258 to conduit 238.

Both fibers 220 and 246 contact screen 234 and are distributed to combining zone 227. Polymer from a supply and extruder (not shown) is supplied to conduit 226, and the gaseous stream through pipes 224 to chamber 228 contacts the polymer as it exits the nozzle at 230 attenuating the polymer into filaments 276 which are mixed with short fibers 272, 274 in forming the tow. If desired, treatment liquid 262 from storage 264 may be applied as discussed above through spray device 268 and conduit 266. The thus treated mixture of fibers is directed to forming horn 278 at 270 and the so formed tow exits at 280 in rounded configuration 282 and is directed to forming rolls 284, either or both of which may be driven to form shaped tow 286 which may be stored or directed for further processing. It will be recognized by these skilled in this art that the embodiments of FIGS. 2 and 3 may also be modified to form tubes much as FIG 1A illustrates such a modification of the embodiment of FIG. 1.

Figure 4:
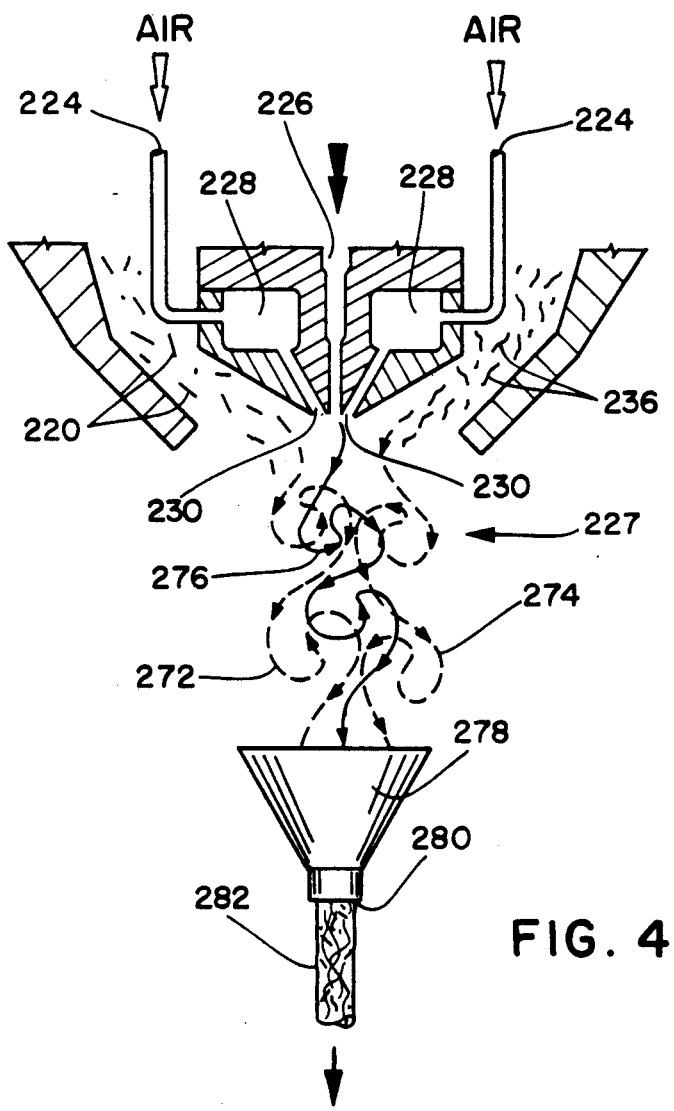
FIG. 4 schematically illustrates, again in partial cross-section, air currents and polymer flow resulting in the fiber distribution of the tow of the present invention.

FIG. 4 illustrates in greater detail the forming section 227 of FIG. 3. While it is not desired to limit the invention to any particular theory, it is believed that the gaseous stream through pipes 224 to chambers 228 and directed at 230 against the exiting polymer from 226 creates turbulent eddies carrying the short fibers 220 and 236 as indicated by the dashed lines into turbulent vorticies wherein mixture with the formed microfibers, indicated in a path shown by a solid line, takes place to thoroughly intermix and form tow 282 upon exit 280 from forming horn 278.

Figure 5:
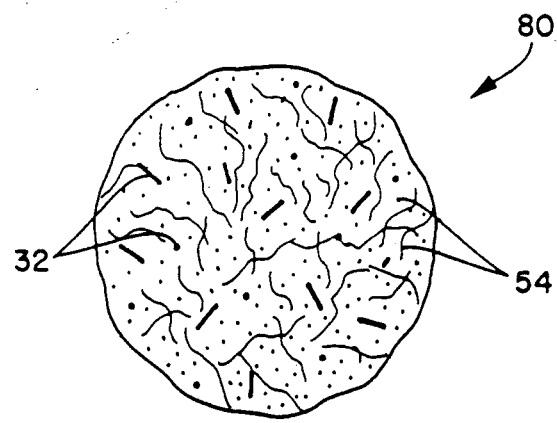
FIGS. 5 through 7 schematically illustrate in cross section tow structures obtainable in accordance with the present invention.
Figure 8:
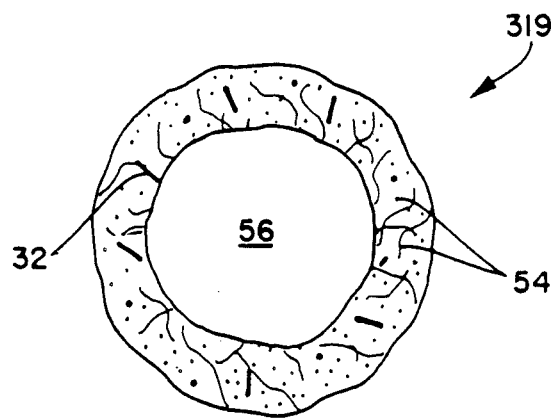
FIGS. 8 through 10 similarly illustrate tube structures.

FIG. 5 schematically illustrates in cross section one form of tow 80 in accordance with the present invention. In this case a generally uniform mixture of staple fibers 32 and microfibers 54 is shown as might be achieved with the apparatus of FIG. 1. FIG. 8 similarly illustrates a tube configuration 319 including, in addition, open central core area 56.

Figure 6:
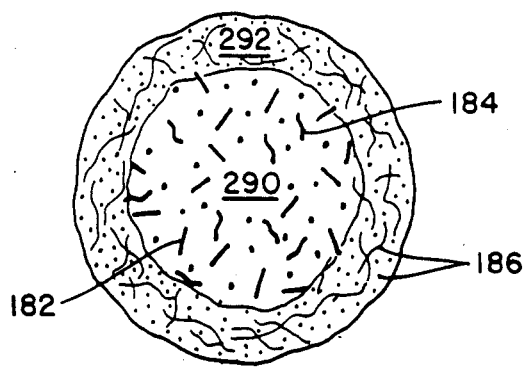
Figure 9:
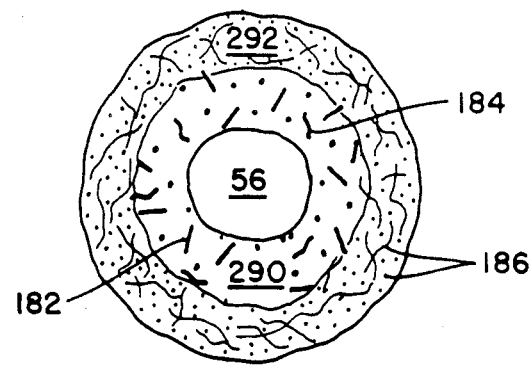
Figure 7:
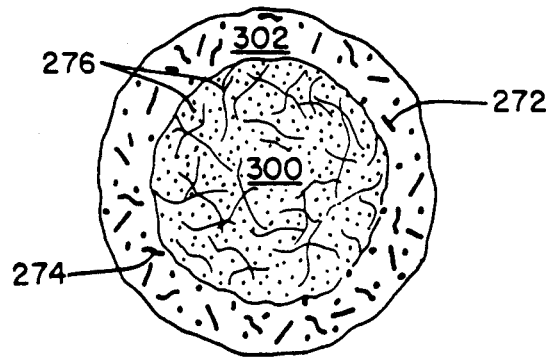
Figure 10:
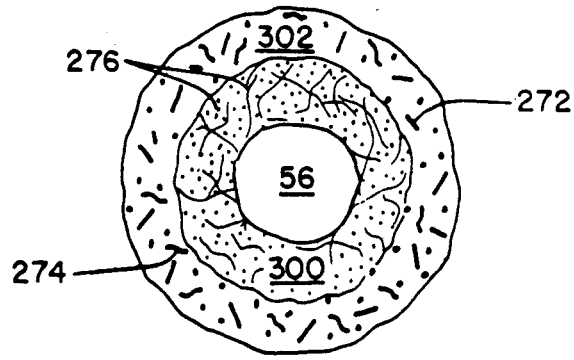

The concentration of any of the types of fibers may be varied. Two such variations are indicated in FIGS. 6, 7, 9 and 10. In FIGS. 6 and 9 the microfibers 186 form higher concentrations in the outer portion 292 and the staple fiber mixture of fibers 182, 184 form central portion 290 which may be achieved, for example, using the apparatus as illustrated in FIG. 1 with a mixed staple batt. The alternative shown in FIGS. 7 and 10 wherein the microfibers 276 are more highly concentrated in the center portion 300 and the shorter fibers 272, 274 more highly concentrated in the circumference area 302, may be formed using the apparatus as illustrated in FIG. 3. Other variations will be apparent to those skilled in this art.

The process and resulting tow or tubes of the present invention can be designed to exhibit widely varying properties. Thus, the rigidity may be controlled either through selection of specific fibers, in particular the short fibers, or by addition of a stiffening agent in the quench spray liquid. Also by varying the concentrations of the fibers specific properties may be obtained. For example, the use of crimped short fibers will impart resilience to the resulting tow, and the use of low melting short fibers will facilitate the means for interbonding the fibers by heat. Preferably, the fibers are bonded at contact points between the microfibers and the shorter fibers, particularly where a high degree of flexibility is desired. If such fibers are low melting, for example, polyethylene or those fibers available from Chisso described as Chisso ES bicomponent fibers, such point bonding may be easily attained by application of heat. The proportion of short fibers ma be increased to affect the cost of manufacture as well. For example, where the short fibers are wood pulp or waste cotton fiber blends such as A1122 from Leigh Fibers, Inc., it may be desirable to increase the proportion so as to reduce costs. In such cases, wood pulp or waste blend fibers up to about 80 percent provide useful tows for beauty coils. Furthermore, even at such high percentages of wood pulp, an integrated tow having sufficient strength properties for such uses is obtained.

The average diameter of the microfibers can be affected by controlling the attenuating air. Preferably the average diameter is up to about 10 microns, and more preferably, up to about 5 microns. Such very fine fibers reduce the size of capillaries and improve the absorbency properties of the resulting tow or tube.

For some applications such as, for example, forming a caulking bead providing insulating properties, the tow may be made adhesive by applying a pressure sensitive adhesive with the quench fluid. Such adhesives are known and may be selected, for example, from those comprising carboxylated styrene butadiene copolymer rubbers. For such uses the sliver may be wound with an interleaving release sheet and simply cut to a desired length and pressed into position when use is required. Other examples of uses include bottle stuffers, sweat bands, and beauty puffs. Others will be apparent to those skilled in this art.

It will also be apparent that the method of the present invention may be used to incorporate other particles or fibrous materials into the sliver or tow by addition to the short fiber carrying air streams. Such particles may include, for example, talc, superabsorbent particles, cigarette flavor enhancers, or the like.

Thus it is apparent that there has been provided, in accordance with the invention, a microfiber and short fiber mixture tow and method of making that fully satisfy the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. Microfiber product of rounded cross section comprising a mixture of thermoplastic microfibers having an average diameter in the range of up to about 10 microns and being discontinuous but with an average length to diameter ratio exceeding about 30,000, said mixture forming a network of physically entangled microfibers containing about 10 to 90% of shorter fibers, said microfibers being predominantly aligned parallel to the axis of said product, and said mixture being bonded at microfiber contact points to minimize release of said shorter fibers.

2. The microfiber product of claim 1 in the form of a tow.

3. The microfiber product of claim 1 in the form of a tube.

4. The microfiber product of claims 1, 2 or 3 wherein said microfibers comprise a thermoplastic polymer and wherein said short fibers are staple fibers selected from the group consisting of rayon, polyester, wood pulp, cotton, cellulose acetate, and mixtures thereof.

5. The microfiber product of claims 1, 2 or 3 wherein said shorter fibers have a length in the range of from about 20 millimeters to 40 millimeters and are present in an amount of from 40% to 80% by weight of the mixture.

6. The microfiber product of claims 1, 2 or 3 further comprising supplemental bonding.

7. The microfiber product of claims 1, 2 or 3 further incorporating fiber or particulate additives incorporated within said network.

8. The microfiber product of claims 1, 2 or 3 having varying concentrations of short fibers and microfibers in the radial direction.

9. The microfiber product of claim 8 wherein the microfibers are highest in concentration at the outside of the product.

10. The microfiber product of claim 8 wherein the shorter fibers are highest in concentration at the outside of the product.

* * * * *